United States Patent [19]

Takami et al.

[11] Patent Number: 4,817,697

[45] Date of Patent: Apr. 4, 1989

[54] APPARATUS FOR GROOVING TIRES

[75] Inventors: Masao Takami; Toru Nagahata, both of Kobe; Masakazu Arita, Kakogawa; Eigi Shibata, Nakama; Tadahiko Tamura, Kitakyushu, all of Japan

[73] Assignee: Sumitomo Rubber Industries, Inc., Hyogo, Japan

[21] Appl. No.: 213,455

[22] Filed: Jun. 29, 1988

Related U.S. Application Data

[63] Continuation of Ser. No. 825,922, Feb. 4, 1986, abandoned.

[30] Foreign Application Priority Data

Feb. 4, 1985 [JP] Japan ................... 60-20288

[51] Int. Cl.$^4$ ............................. B29H 21/08
[52] U.S. Cl. ...................... 157/13; 409/216; 73/74; 73/171; 219/235
[58] Field of Search .................. 157/13; 51/DIG. 33, 51/165.73, 33 R, 55, 58, 165 R, 124 L; 219/235; 83/170, 171, 74, 75, 15, 16; 409/165, 166, 199, 201, 211, 216, 135, 136, 150, 194; 156/96

[56] References Cited

U.S. PATENT DOCUMENTS

| | | | |
|---|---|---|---|
| 2,494,412 | 1/1950 | Simkins | 219/235 X |
| 2,568,040 | 9/1951 | Touvey . | |
| 3,178,968 | 4/1965 | Pettigrew et al. | 409/216 X |
| 3,806,691 | 4/1974 | Roach | 409/211 X |
| 3,900,971 | 8/1975 | Brueck | 51/55 X |
| 3,999,589 | 12/1986 | Meacheam . | |
| 4,020,743 | 5/1977 | Feldcamp . | |
| 4,081,017 | 3/1978 | Appleby et al. | 157/13 |
| 4,137,516 | 1/1979 | Shaw et al. | 51/165 R X |
| 4,147,196 | 4/1979 | Jarry . | |
| 4,148,236 | 4/1979 | Holoyen et al. | 83/74 |
| 4,200,015 | 4/1980 | Gerber | 83/74 X |
| 4,206,009 | 6/1980 | Kazares . | |
| 4,206,798 | 6/1980 | Ray et al. | 157/13 |
| 4,237,955 | 12/1980 | Clayton | 157/13 |
| 4,311,182 | 1/1982 | Clayton . | |
| 4,502,459 | 3/1985 | Dyer | 51/165.73 X |
| 4,601,224 | 6/1986 | Clark, III | 83/171 X |

FOREIGN PATENT DOCUMENTS

| | | |
|---|---|---|
| 551713 | 10/1981 | Australia . |
| 0038278 | 10/1981 | European Pat. Off. . |
| 1168211 | 4/1964 | Fed. Rep. of Germany . |
| 2718935 | 12/1977 | Fed. Rep. of Germany . |
| 56-162633 | 12/1981 | Japan . |
| 59-70553 | 4/1984 | Japan . |
| 59-215849 | 12/1984 | Japan . |
| 1592558 | 7/1981 | United Kingdom . |

OTHER PUBLICATIONS

Patent Abstracts of Japan, 130 M 372.
Patent Abstracts of Japan, 16 M 318.
Patent Abstracts of Japan, vol. 7, No. 203, (M-241) (1348) Sep. 8, 1983 of JP-A-58 102,661 (Machida Oputo Giken K.K.) 18-6-1983.

Primary Examiner—Debra Meislin
Attorney, Agent, or Firm—Birch, Stewart, Kolasch & Birch

[57] ABSTRACT

An apparatus for grooving a tire which comprises a tire support shaft for rotatably supporting the tire and a support frame having a cutter device mounted thereon. The cutter device and the tire support shaft are movable relative to each other in a transverse direction parallel with the tire support shaft and perpendicular to the tire support shaft. The cutter is supportable at a desired angle with the tread surface, and the cutter blade is rotatable in the direction of the groove to be formed. The cutting position of the cutter is on the axis of an arm support shaft and is controllable by the combination of orthogonal coordinates to simplify the control program for the apparatus. When required, the cutter is swingably attached to a cutter holder to enable the cutter to cut the tire rubber and to be released therefrom with ease without the need to heat the cutter. When the cutter is provided with a heater, the cutter heating temperature and operation speed are so controlled that the temperature of rubber around the cutter is maintained at a predetermined constant level.

17 Claims, 10 Drawing Sheets

FIG. 8
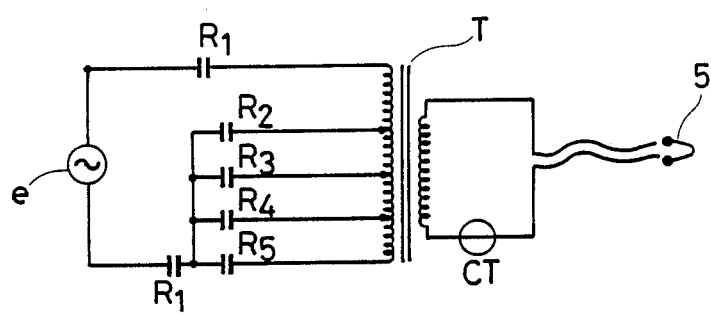
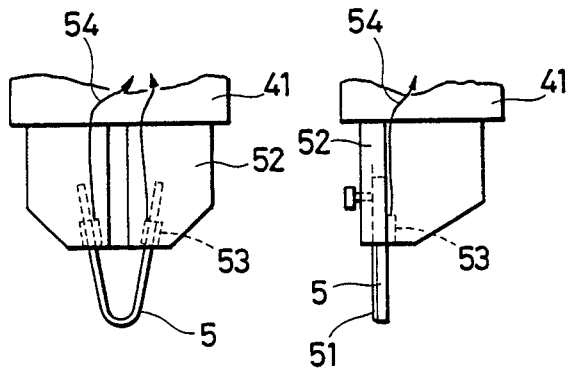
FIG. 9(a)   FIG. 9(b)

APPARATUS FOR GROOVING TIRES

This application is a continuation of application Ser. No. 825,922 filed on Feb. 4, 1986, now abandoned.

BACKGROUND OF THE INVENTION

The present invention relates to a grooving apparatus for cutting a tread pattern in tires.

Conventionally, a hand cutter was generally used for manually grooving tires which were produced for testing purposes or on a small scale production basis, i.e., for forming a tread groove pattern in vulcanized plain tires having no tread pattern. This manual procedure requires skill and is time-consuming. For large size tires having a relatively simple groove pattern, therefore, Unexamined Japanese Patent Publication No. SHO 56-162633, for example, discloses an apparatus which comprises a shaft for supporting a tire, a support frame movable axially with respect to the shaft and perpendicular to the shaft, and a cutter shaft mounted on the support frame, directed toward the surface of the tire to be worked on and rotatable according to the angle of the groove to be formed, such that a cutter is heated and caused to cut into a shoulder face of the tire. For heating and movement along the contemplated pattern, the cutter is controlled by a programmed computer.

Although large size tires generally have simple tread patterns which can be formed by relatively simple movement of the heated cutter, small size tires such as passenger car tires have grooves of complex shapes which require complex movement of the cutter. The prior art devices are not always capable of meeting this requirement. Further, because the pattern grooves are cut by the heated cutter and the rubber portion around the cutter is heated, for example, to a temperature of about 200° C. or higher, it is very likely that the physical properties of the vulcanized rubber change the elasticity of the rubber is impaired and the quality of the tire is adversely affected. The heating is also likely to scorch or melt the neighboring rubber portion, failing to form grooves of a clear-cut shape or to assure the required running characteristics fully. When forming grooves of a double stepped shape, the cutter will burn out so as to become inoperative. Another problem encountered is that the heating reduces the durability of the cutter.

Although it appears possible to use a multi-articulated robot for supporting the cutter for grooving, the cutter shaft must then be given greater freedom, which renders the control program complex, thus making the tire grooving apparatus expensive.

SUMMARY OF THE INVENTION

Accordingly, the present invention provides a primary structure comprising a cutter device mounted on a support frame and a tire support shaft which are movable relative to each other in a transverse direction parallel with the tire support shaft and in a direction perpendicular to the shaft, an arm support shaft projecting from the support frame, a pivotal arm mounted on the arm support shaft, a cutter holder rotatably mounted on the pivotal arm and positioned at right angles with the axis of pivotal movement of the arm, and a cutter attached to the forward end of the cutter holder, the cutter having the cutting position on the axis of the arm support shaft.

The above structure is additionally provided with means for swinging the cutter in the cutting direction at the start and end of cutting and/or means for heating the cutter. The structure is further provided with means for controlling the temperature and/or the velocity of movement of the cutter.

With the primary structure, the cutting position of the cutter is retained on the axis of the arm support shaft at all times, and the axis comes into line with the cutting position, so that the amount of movement of the support frame as well as the pivotal arm can be calculated with ease. This makes programming of the computer easy for the present apparatus. Further, when the cutter only is adapted to swing in the cutting direction for a shoveling action, grooves can be cut with the cutter without heating the cutter.

When the cutter is caused to swing in the cutting direction while being heated, the initial cut can be formed quickly, so that the cutter is prevented from burning. Moreover, if the means is provided for controlling the temperature and/or velocity of the cutter, the control means assures sharp cutting, reduced damage to the rubber, prolonged cutter life and increased cutting speed.

The present invention will become more fully understood from the detailed description given hereinbelow and the accompanying drawings which are given by way of illustration only, and thus are not limitative of the present invention, and wherein:

BRIEF DESCRIPTION OF THE DRAWINGS

FIG. 8 is a diagram showing the electric circuit of a cutter heating means according to a second embodiment of the present invention;

FIGS. 9(a) and (b) are a front view and a side elevational view, respectively, showing means for detecting stress acting on a cutter according to a third embodiment of the present invention;

DESCRIPTION OF THE PREFERRED EMBODIMENTS

Figure 1:
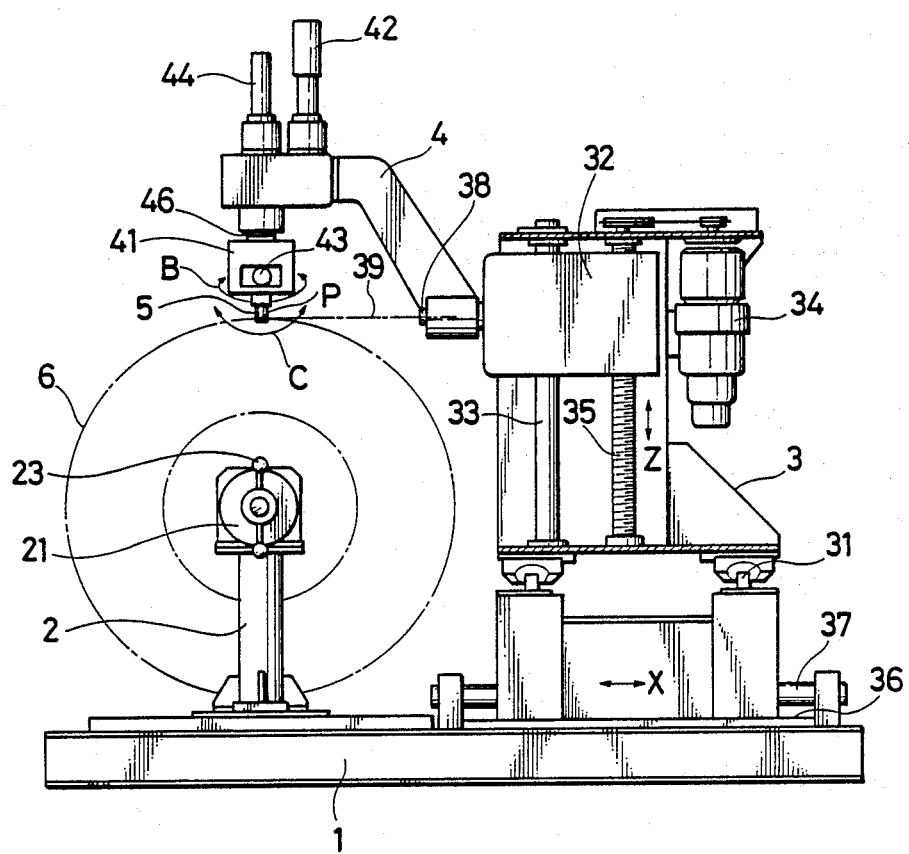
FIG. 1 is a side elevational view showing a first embodiment of the present invention.

A first embodiment of the present invention will be described below with reference to FIGS. 1 and 2.

The apparatus includes a base 1, a tire support 2, a carriage 3, a pivotal arm 4, a cutter 5 and a tire 6.

The tire support 2 is fixedly mounted on the base 1. The tire 6 is mounted on a tire support shaft 21 on the support 2 and is rotated by a motor 22 through an unillustrated reduction gear. A tire fastening handle 23 is provided.

The carriage 3 is movable in a transverse direction (Y-axis direction) parallel with the tire support shaft 21 on rails 31 parallel with the shaft 21 by an unillustrated motor and screw rod. A support frame 32 supported by the carriage 3 is movable upward or downward (Z-axis direction) along a guide rod 33. The frame 32 is movable through a ball screw by rotating a screw rod 35 by a motor 34.

The carriage 3 may be made movable on rails 36 on the base 1 along a guide bar 37 by an unillustrated motor and screw rod, in a direction perpendicular to the axis of the tire support shaft 21, i.e., toward or away from the tire 6 (X-axis direction). This movement gives the movement of the cutter increased freedom for cutting large size tires.

Figure 5:
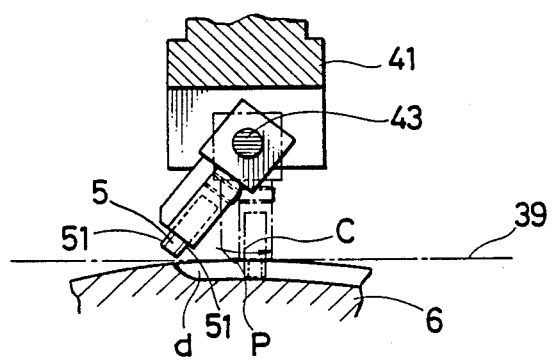

An arm support shaft 38 projecting from one side of the support frame 32 has an axis 39 extending in the X-axis direction perpendicular to the tire support shaft 21, and being in line with the cutting position P for the cutter as shown in FIG. 5 (see dotted line). The shaft 38 is rotatable about the axis 39 in the direction of arrow A shown in FIG. 2 by a motor within the frame 32 through an unillustrated reduction gear, whereby the cutter 5 is maintained at a desired angle with respect to the curved surface of the tire tread. It is especially desirable that the axis 39 be in alignment with a tangent to the cutting position P.

When the cutting position P is on the axis 39 of the arm support shaft 38, the cutting point and the center of movement are at the same point, so that the amount of movement of the cutting position can be calculated in terms of the amount of movement of the axis 39 only. This facilitates programmed control by a computer.

Figure 13:
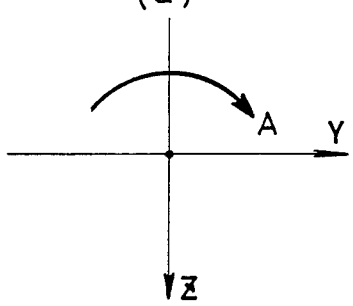
FIGS. 13(a) and (b) are diagrams for illustrating the operation of the first embodiment.
FIG. 13(c) is a diagram for illustrating the operation of the related-art apparatus.
Figure 13:
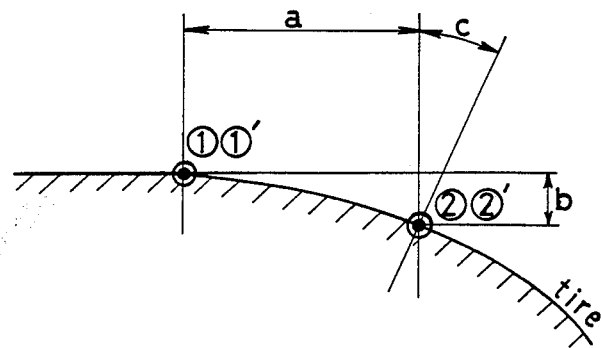
Figure 13:
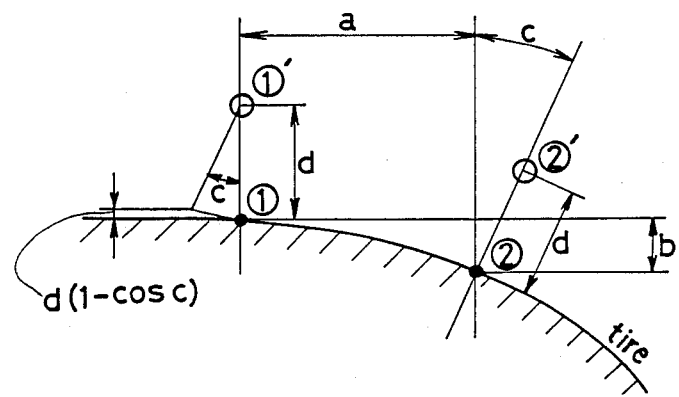

With reference to FIG. 13(a), the directions of movement of the cutter with respect to the axis are represented by A, Y and Z. As seen in FIG. 13(b), cutting points (1) (before movement) and (2) (after movement) coincide with centers of movement (1)' and (2)', respectively, according to the present invention. Accordingly, the amount of movement of axis A (axis 39) is calculated as follows:

$$Y2 = Y1 + a$$

$$Z2 = Z1 + b$$

$$A2 = A1 + c$$

With the above-mentioned apparatus of the related art, cutting points (1), (2) differ from centers of movement (1)', (2)' as seen in FIG. 13(c), so that the amount of movement of axis A is calculated as follows.

$$Y2 = Y1 + a + d \cdot \sin c$$

$$Z2 = Z1 + b + d(1 - \cos c)$$

$$A2 = A1 + c$$

wherein d is the distance between the cutting point (1) or (2) and the center of movement (1)' or (2)'. With the related art apparatus, the amounts of movement along the Y axis and the Z axis need to be calculated in addition to that along the A axis for the correction of the cutting point relative to the center of movement.

The pivotal arm 4, which is fixedly mounted on the arm support shaft 38, is provided with a cutter holder 41 at its forward end. The holder 41 is positioned perpendicular to the axis 39 and rotatable in the direction of arrow B about a cutter holder shaft 46 by a motor 42 through an unillustrated reduction gear. By this rotation, the direction F of cutting by the cutter 5 (FIG. 4) is made to agree with the direction of a groove 63 to be formed. Additionally, as seen in FIG. 5, the cutter 5 is mounted on a swing shaft 43 mounted on the holder 41 and extending transversely thereof so that the cutting position P will be on the axis 39.

Figure 2:
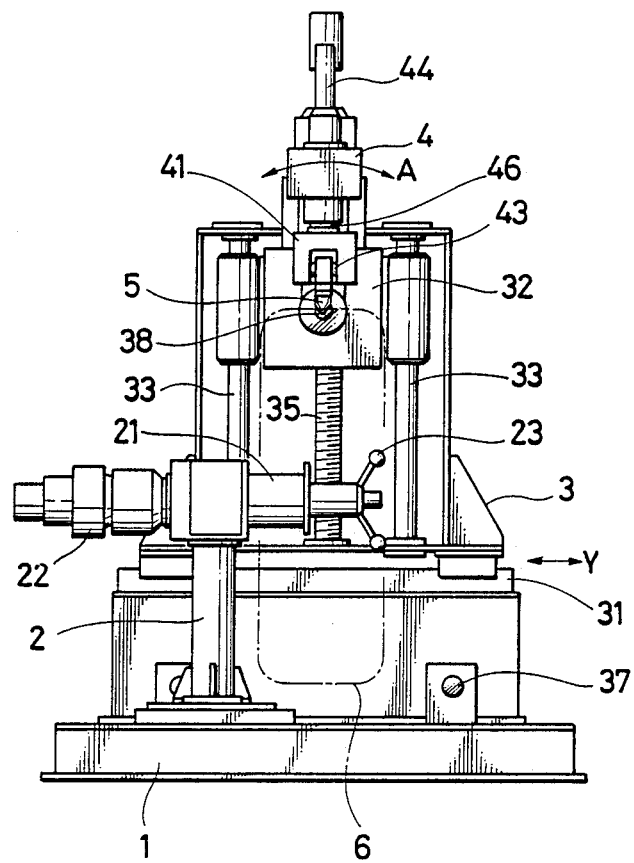
FIG. 2 is a front view of a first embodiment of the present invention.
Figure 3:
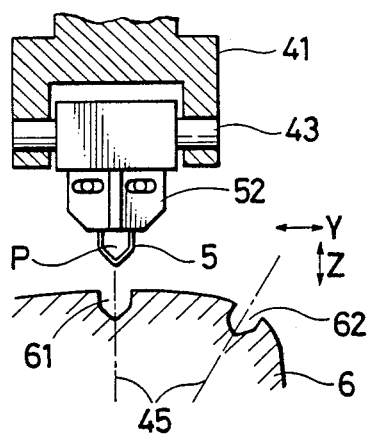
FIGS. 3, 4 and 5 are diagrams showing the position of a cutter during a cutting operation.

When an actuator 44 is provided as seen in FIGS. 1, 3 and 5 for rotating the swing shaft 43 at the start and end of cutting to swing the cutter 5 in the cutting direction (arrow C in FIG. 1), the swing of the cutter by the actuator 44 reduces cutting stress for the cutter, whereby the load of the cutter blade can be diminished. Consequently, tread grooves can be cut easily without the necessity of heating the cutter 5.

Servo motors of the electric or hydraulic type are used as the motors. As shown in FIG. 3, the cutter 5, when seen from the front, is U-shaped, V-shaped or otherwise shaped in conformity with the shape of the groove to be formed. The cutter is fixedly held by clamp means 52, and the position thereof is adjustable depthwise so that the cutting position P will coincide with the axis 39. The cutter has a cutting edge 51 at one or each side as seen in FIG. 5.

The motors and the actuator are controlled by a computer under programmed command according to the diameter and tread pattern of tires.

Figure 6:
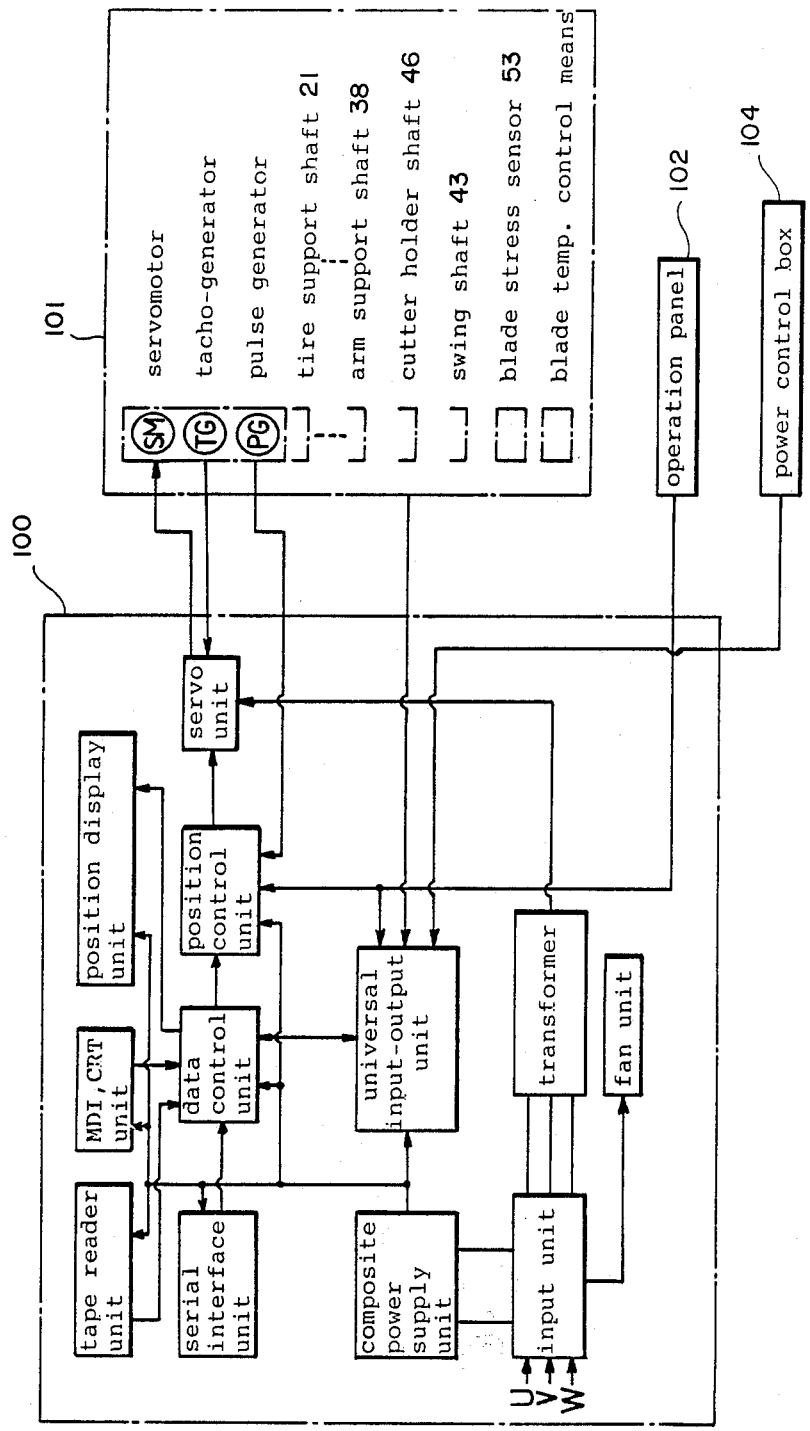
FIG. 6 is a block diagram showing a control system.
Figure 7:
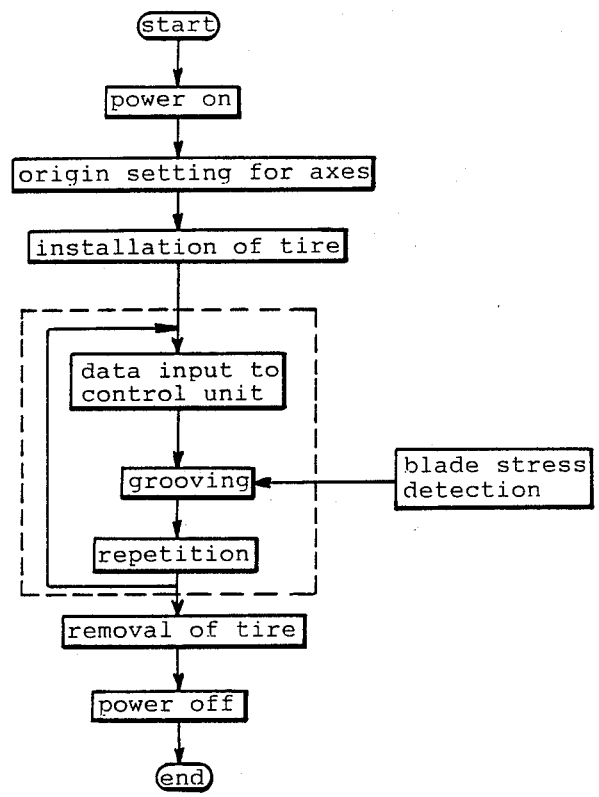
FIG. 7 is a flow chart for the operation of the first embodiment.

FIG. 6 shows the overall computer control system. Indicated is the computer 100, the grooving apparatus 101 of the present invention, a control panel 102 and a power control box 104. FIG. 7 is an operational flow chart.

The operation of the first embodiment (wherein the cutter is not heated) will be described. With reference to the flow chart of FIG. 7, the axes are set to a predetermined origin, a tire 6 is fixedly mounted on the tire support shaft 21, and the motor 22 is turned on to rotate the tire.

The carriage 3 is moved along the rails 31 in the Y-axis direction, and the support frame 32 is lowered in the Z-axis direction by the motor 34 and the screw rod 35 to adjust the cutter 5 so that grooves are cut at the top of the tire 6.

When the rails 36 are provided, the carriage 3 is moved in the X-axis direction (toward or away from the tire) to adjust the cutting position of the cutter.

Figure 4:
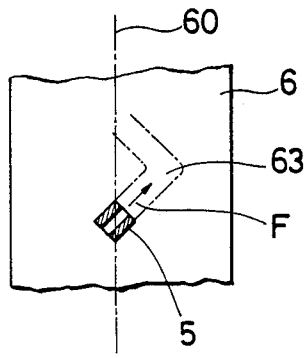

The angle of the pivotal arm 4 is adjusted by rotating the arm support shaft 38 so that the axis 45 of the cutter 5 will be at a desired angle with the tire tread as shown in FIG. 3. For example, for a vertical groove 61 as shown in FIG. 3, the arm 4 is positioned vertically, while for an inclined groove 62, the arm 4 is turned in the A direction (FIG. 2) in accordance with the inclination to incline the cutter axis 45. At this time, the carriage 3 is moved in the Y-axis direction, and the support frame 32 is adjusted in the Z-axis direction in accordance with the position of the groove to be cut. With the present apparatus, the cutting point coincides with the center of movement. This facilitates calculation of the amount of movement and control by the computer. For a tread pattern groove 63 which is inclined with respect to the center line 60 of the tire as seen in FIG. 4, the cutter holder 41 is rotated by the motor 42 in the direction of arrow B (FIG. 1) about the cutter holder shaft 46 to cause the cutting direction F of the cutter 5 (shown in section in FIG. 4) to agree with the direction of the inclined groove 63.

When the cutter 5 is to bite into the tire 6 at a groove start portion d with the start of the grooving operation, the swing shaft 43 is rotated in the direction of arrow C (cutting direction) shown in FIG. 5 by the actuator 44 (FIG. 1) to swing the cutter 5 only and force the cutter into the tire surface in the cutting direction. This movement reduces cutting stress and diminishes the load on the cutter 5, consequently decreasing the likelihood of the cutter 5 breaking and permitting the cutting edge 51 to cut the vulcanized hard tread rubber. Thus, the tire can be cut easily without the need to heat the cutter.

When the cutter 5 is to be removed from the tire at the groove end portion (not shown), the actuator 44 similarly swings the cutter in the removing direction.

During the cutting operation, the carriage, pivotal arm, cutter holder and cutter are moved under the control of the computer 100 shown in FIG. 6. Useful for this control are position sensors, such as encoders, for detecting the movement of parts of the apparatus 101 by the motors and a stress sensor for detecting the stress acting on the cutter (An embodiment equipped with such a stress sensor will be described later). The detection signals as control factors are fed to a data control unit, whereby optimum cutting conditions (e.g., cutter speed in the present embodiment) are determined for continuation of a smooth cutting operation.

The present embodiment can be so modified that the arm support shaft 38 for the pivotal arm 4 is mounted on the support frame 32 vertically to position the cutter 5 immediately beside the tire 6.

While the foregoing first embodiment refers to a tire grooving operation without heating the cutter, a second embodiment of the present invention includes suitable means for heating the cutter 5. This embodiment has the advantage that the cutter cuts at a higher speed with greater sharpness than when the cutter is not heated. When heated, the cutter easily cuts grooves without swinging, but if caused to swing, the cutter starts to cut at a further increased speed, and this has the advantage of preventing the drawback of decrease of the cutter life due to the burning of the cutter before cutting.

FIG. 8 shows the electric circuit of the heating means, in which the primary winding of a transformer T is connected to an A.C. power supply e via relay contacts R1 to R5. The cutter 5 is connected to the secondary winding of the transformer via a current transducer CT for checking discontinuity for checking the breakdown of the cutter.

When the cutter 5 is to be heated, the relay contact R1 is closed, and one of the relay contacts R2 to R5 is closed. The current through the cutter 5 increases to give a larger amount of heat to the cutter as the closed relay contact shifts from contact R5 toward contact R2. The relay contacts are closed immediately before cutting to heat the cutter 5 and cut the tire. On completion of the cutting operation, i.e., immediately before the cutter 5 is removed from the tire into air, the relay contacts are opened, whereby burning of the cutter can be prevented. The amount of current through the cutter 5 is checked by the current transducer CT, and when the current is interrupted, an alarm is given to indicate a breakdown of the cutter 5.

Tires can be grooved by the cutter with heating and with a swing motion similarly by controlling blade temperature control means (FIG. 6) having the current value varying circuit and included in the grooving apparatus 101, by the computer 100 (FIG. 6) under a program.

According to a third embodiment of the present invention, the second embodiment is further provided with means for detecting stress on the cutter for optimally controlling the temperature and/or operation speed of the cutter based on the detection signal from the stress detecting means. This embodiment will be described with reference to FIGS. 9 to 11. FIGS. 9(a) and (b) show a blade stress sensor 53, for example, of the strain gauge type in contact with the holding portion of the cutter 5. Via lead wires 54, the detection signal from the sensor is fed from the grooving apparatus 101 (FIG. 6) to a universal input-output unit (FIG. 6) in the computer 100.

Figure 10:
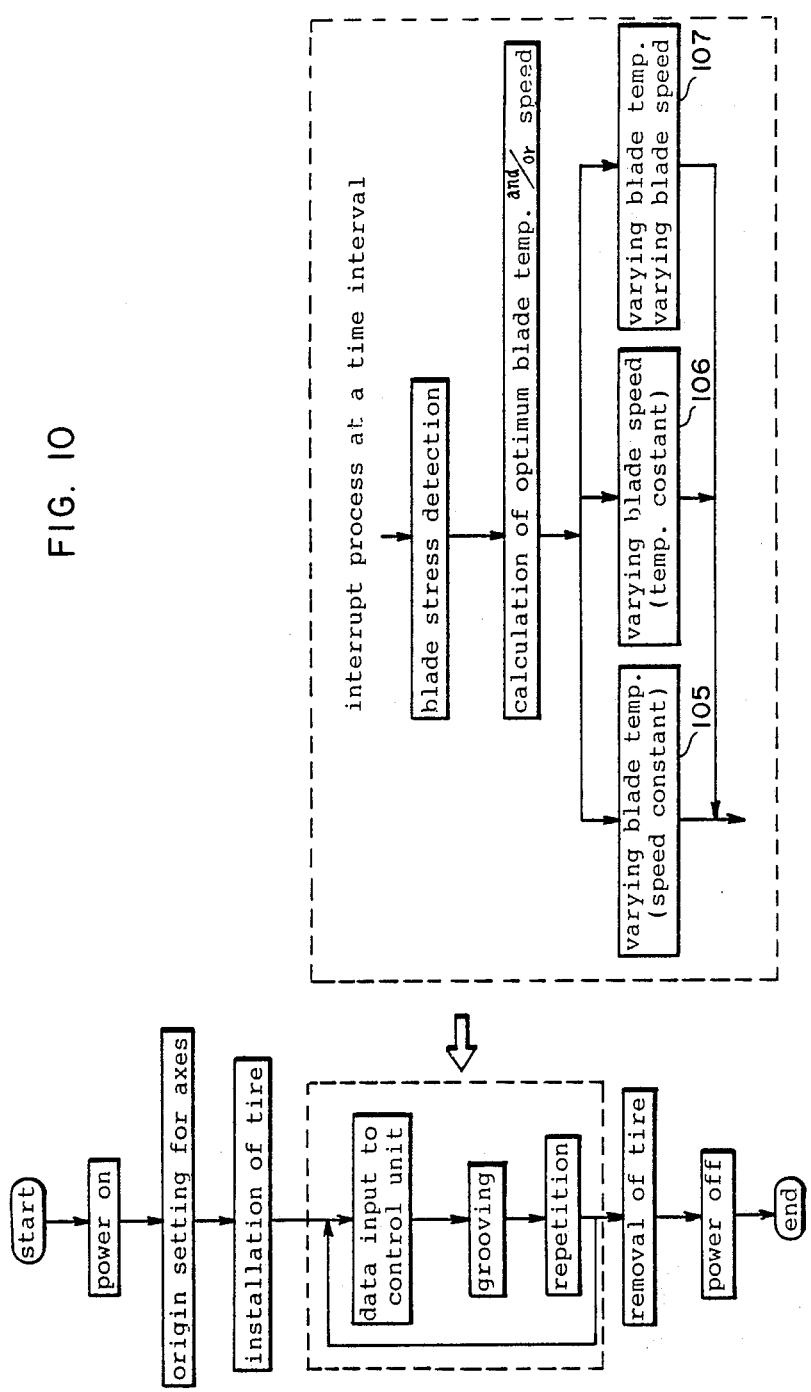
FIG. 10 is a flow chart for the operation of the third embodiment.
Figure 11:
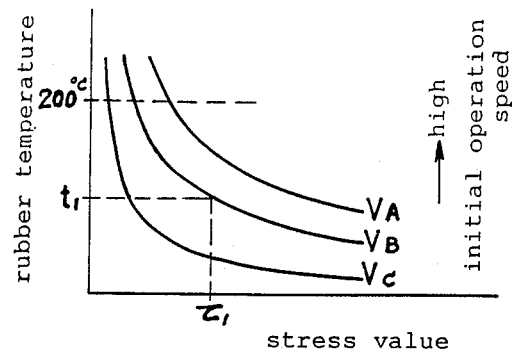
FIG. 11(a) is a characteristics diagram showing the relationship between the stress and the rubber temperature around the cutter at varying cutter operation speeds to illustrate control based on stress detection for the third embodiment.
FIG. 11(b) is a characteristics diagram showing the relationship between the stress and the cutter heating temperature at varying cutter operation speeds.
Figure 11:
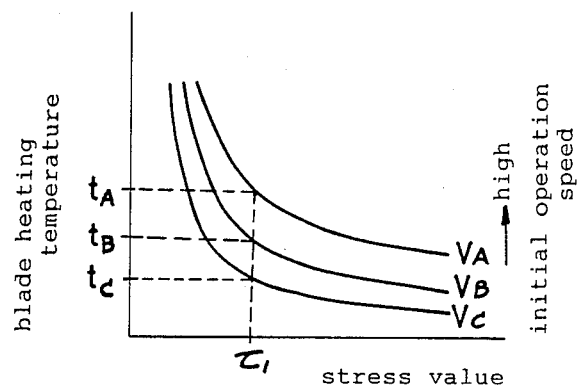

FIG. 10 shows a flow chart for controlling the blade temperature and/or operation speed in grooving by performing the predetermined calculations to be stated below based on the detection signal from the stress sensor and executing an interrupt process at a given interval.

This control based on stress detection basically resides in controlling the cutter heating temperature and operation speed so that the temperature of rubber around the blade is maintained at a level below 200° C. (i.e., at a temperature which does not cause damage to the rubber and which assures sharp cutting).

First, the values to be set for the control are determined by the following procedures:

(1) For each of the tires of various tread rubber compounds, a grooving experiment is conducted using a sensor for measuring the rubber temperature around the blade, a blade stress sensor, a cutter operation speed measuring instrument and blade heating temperature measuring instrument to measure these temperatures, cutter operation speeds ($V_A$, $V_B$, $V_C$, ...) and blade stress values and to establish the relation between the rubber temperature around the blade, the blade stress value and the cutter operation speed as seen in FIG. 11(a), and the relation between the blade heating temperature (tA, tB, tC ...), the blade stress value and the cutter operation speed as seen in FIG. 11(b), and the relations as shown in FIGS. 11(a) and (b) are based on an inverse proportion or an exponential function;

(2) An optimum rubber temperature (below 200° C.) t1 around the blade is optionally determined for each shape of groove to be cut (or for each cutting unit (in the same direction)). The temperature t1 is dependent on the rubber compound, cutter breakdown ratio, cutting conditions (quick or slow cutting), etc. The cutter heating temperature and operation speed are to be so controlled that the rubber temperature around the blade will be at the constant value t1;

(3) With reference to FIG. 11(a), the optimum rubber temperature t1 around the blade is set in terms of an optimum blade stress value 1 (in the case of initial operation speed $V_B$). The initial operation speed is determined by the shape of groove (depth, width, straight or curved); and (4) With reference to FIG. 11(b), an optimum blade heating temperature tB giving the optimum blade stress value $\tau 1$ is determined (at the initial operation speed $V_B$). The temperature tB is a condition to be set for computer control.

The control based on the set values can be effected by three methods, i.e., a first method 105 in which the blade heating temperature is varied with the cutter operation speed maintained at a constant value, a second method 106 wherein the cutter operation speed is varied with the cutter heating temperature kept constant (inclusive of a case where the cutter is not heated), and a third method 107 wherein the cutter heating temperature and the operation speed are varied as seen in FIG. 10. By these methods of control, the rubber temperature around the blade, in other words, the stress value can be maintained at a constant (predetermined) value.

The temperature of the cutter is controlled by the blade temperature control means having the current value varying circuit already described with reference to the second embodiment. The operation speed is controllable by a position control unit and servo control unit (FIG. 6) of the microcomputer 100. The control is effected not only during grooving but also during the swing motion (at the start and end of cutting).

The temperature of the cutter blade, i.e., the value of current to be passed through the blade and the operation speed of the blade for starting a cutting operation are values predetermined according to the rubber temperature, the composition of the rubber compound, the shape of groove to be formed, etc. These values are thereafter calculated as specified at a given time interval based on the stress detected.

The three methods 105, 106 and 107 will be described individually with reference to FIGS. 12(a), (b) and (c):

(1) First method wherein the heating temperature is varied, with the blade operation speed kept constant With reference to FIG. 12(a) (similar to FIG. 11(a)), suppose the set stress value is $\tau 1$, and the detected stress value is $\rho 2$ (same as hereinafter). If $\tau 2 > \rho 1$, the blade heating temperature is increased by the small temperature difference $\Delta t$ between the current level and the optimum heating temperature (set value). The blade heating temperature therefore reaches the set value, and the stress is corrected to the set value also, so that the rubber temperature is maintained at a predetermined constant level. This method controls the cutter temperature singly, hence assuring a simple grooving control.

Figure 12:
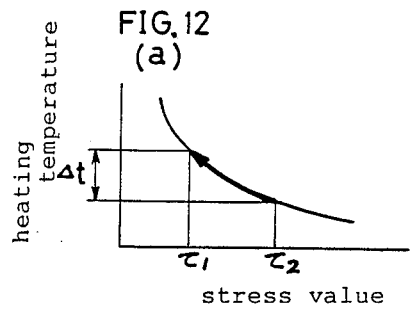
FIGS. 12(a) to (c) are diagrams for illustrating three methods of control based on stress detection.
Figure 12:
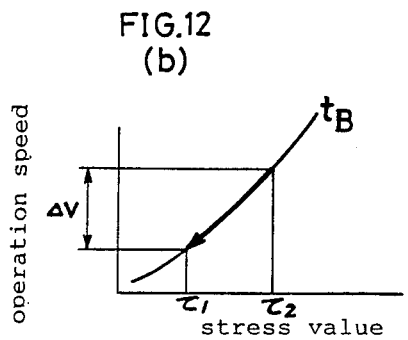
Figure 12:
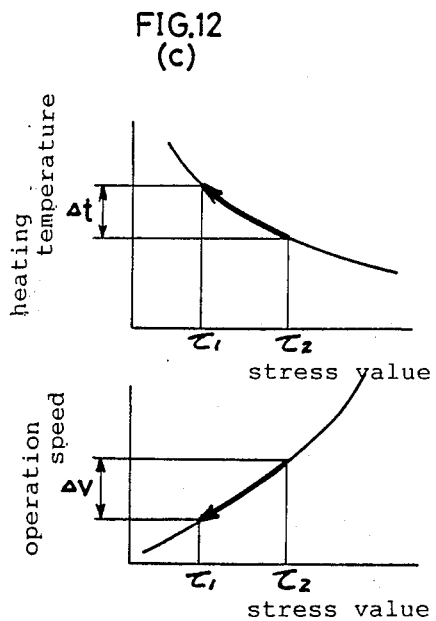

(2) Second method wherein the operation speed is varied, with the heating temperature kept constant As seen in FIG. 12(b) (determined from FIG. 11(b)), if $\tau 2 > \tau 1$, the operation speed is reduced by the small speed difference $\Delta V$ between the current speed and the optimum operation speed (set value). This permits the operation speed to reach the set value and the stress value to be corrected to the set value, so that the rubber temperature is maintained at the predetermined constant value. This method is suited to rubber compounds which are prone to damage due from heating.

(3) Third method wherein both the heating temperature and the operation speed are varied When $\tau 2 > \tau 1$ as seen in FIG. 12(c), the heating temperature is increased by $\Delta t$, and the operation speed is decreased by $\Delta V$. This method assures control with higher precision than the methods (1) and (2).

The three control methods 105, 106 and 107 involving the foregoing calculations enable the cutter to cut the tire rubber with improved sharpness with reduced damage to the rubber and give a prolonged life to the cutter. The second and third methods 106 and 107 control the cutting operation with higher precision.

Besides these control methods, PID (proportion, integration, differentiation) control can be resorted to based on the detected stress value to achieve improved precision control.

Thus, the present invention of an apparatus for grooving a tire provides a primary structure comprising a cutter device mounted on a support frame and a tire support shaft for rotatably supporting the tire which are movable relative to each other in a transverse direction parallel with the shaft and in a direction perpendicular to the shaft, an arm support shaft projecting from the support frame, a pivotal arm fixedly mounted on the arm support shaft, a cutter holder mounted on the pivotal arm and positioned at right angles with the axis of the arm support shaft, and a cutter attached to the cutter holder, the cutting position of the cutter being located on the axis. The apparatus is therefore adapted to form versatile groove patterns according to a simplified control program and is inexpensive in its entirety. When the cutter is made swingable in the cutting direction without heating, problems such as scorching of the tire, collapse of grooved portions, and damage to the cutter can be eliminated. When the cutter is made to swing as heated, the cutter starts cutting at a higher speed with a reduced likelihood of blade burning.

The blade temperature and/or speed may be controlled based on the detected stress value so that the rubber temperature around the blade is maintained at an optimum value. This enables the cutter to cut the tire rubber with increased sharpness and reduced damage to the rubber, further giving a prolonged life to the cutter.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for grooving a tire, which comprises:
a base portion,
tire support means for supporting and rotating a tire, said tire support means being mounted on said base portion,
said tire support means including a tire support shaft extending in a first longitudinal direction,
a support frame mounted on said base portion,
an arm support shaft projecting from said support frame, said arm support shaft having a longitudinal axis extending in a second longitudinal direction,
pivotal arm means having first and second ends with said first end thereof being pivotally mounted on said arm support shaft,
cutting means connected to said second end of said pivotal arm means,
means for providing relative movement between said cutting means and said tire support shaft in said first longitudinal direction and perpendicular to said first longitudinal direction,
said cutting means including a cutter holder shaft having an axis and being attached to said pivotal arm means, said cutter holder shaft axis extending in a direction which is perpendicular to said second longitudinal direction of said longitudinal axis of said arm support shaft, a cutter holder attached to said cutter holder shaft, said cutter holder being rotatable about said axis of said cutter holder shaft, and a cutter attached to said cutter holder, and said cutter when cutting said tire being located so that it intersects a line which is an extension of said longitudinal axis of said arm support shaft.

2. The apparatus as defined in claim 1 wherein said cutter is pivotally mounted on said cutter holder to render said cutter swingable in the direction of cutting.

3. The apparatus as defined in claim 2, further comprising means for heating said cutter.

4. The apparatus as defined in claim 3, wherein said tire support shaft, said support frame, said pivotal arm means, said cutter holder and said cutter are movable under the control of a computer.

5. The apparatus as defined in claim 5, wherein said means for heating said cutter comprises an electrical circuit, and said circuit includes means for indicating a breakdown of said cutter upon current interruption in said circuit.

6. An apparatus as defined in claim 1, further comprising means for heating said cutter.

7. The apparatus as defined in claim 6, wherein said tire support shaft, said pivotal arm means, said cutter holder and said cutter are movable under the control of a computer.

8. The apparatus as defined in claim 6, wherein said means for heating said cutter comprises an electrical circuit, and said circuit includes means for indicating a breakdown of said cutter upon current interruption in said circuit.

9. The apparatus as defined in claim 1, further comprising means for heating said cutter, means for detecting the stress acting on said cutter during cutting, means for controlling the temperature of the cutter, and means for controlling the operation speed of said cutter.

10. The apparatus as defined in claim 9, wherein said tire support shaft, said support frame, said pivotal arm means, said cutter holder, and said cutter are movable under the control of a computer.

11. The apparatus as defined in claim 9, wherein said means for heating said cutter comprises an electrical circuit, and said circuit includes means for indicating a breakdown of said cutter upon current interruption in said circuit.

12. The apparatus as defined in claim 2, further comprising means for heating said cutter, means for detecting the stress acting on said cutter during cutting, means for controlling the temperature of said cutter and means for controlling the operation speed of said cutter.

13. The apparatus as defined in claim 12, wherein said tire support shaft, said support frame, said pivotal arm means, said cutter holder, and said cutter are movable under the control of a computer.

14. The apparatus as defined in claim 12, wherein said means for heating said cutter comprises an electrical circuit, and said circuit includes means for indicating a breakdown of said cutter upon current interruption in said circuit.

15. The apparatus as defined in claim 1, wherein said support frame is mounted on said base portion by support means, and said support means is movable in said second longitudinal direction.

16. The apparatus as defined in claim 1, further comprising means for heating said current, means for detecting the stress acting on said cutter during cutting, and means for controlling the operation speed of said cutter.

17. The apparatus as defined in claim 1, further comprising means for heating said cutter, means for detecting the stress acting on said cutter during cutting, and means for controlling the temperature of the cutter.

* * * * *